United States Patent [19]
Wu

[11] Patent Number: 5,412,951
[45] Date of Patent: May 9, 1995

[54] CYROGENIC COOLING SYSTEM WITH ACTIVE VIBRATION CONTROL

[75] Inventor: Yeong-Wei A. Wu, Rancho Palos Verdes, Calif.

[73] Assignee: Hughes Aircraft Company, Los Angeles, Calif.

[21] Appl. No.: 179,636

[22] Filed: Dec. 22, 1993

[51] Int. Cl.⁶ .............................................. F25B 9/00
[52] U.S. Cl. ............................................ 62/6; 60/520
[58] Field of Search .................. 62/6, 296; 60/520; 381/94

[56] References Cited

U.S. PATENT DOCUMENTS 4,567,726  2/1986  Vitale et al. ........................ 60/520
5,245,830  9/1993  Aubrun et al. ........................ 62/2

*Primary Examiner*—William E. Wayner
*Attorney, Agent, or Firm*—Hugh P. Gortler; M. W. Sales; W. K. Denson-Low

[57] ABSTRACT

A cryogenic cooling system having a mechanism for canceling vibration at a fundamental frequency and at harmonics thereof. The inventive system includes a first apparatus (28, 32) for cooling a mass. The first apparatus (28, 32) creates a vibration at a first frequency and a second frequency. In a typical application, the first frequency is a fundamental frequency and the second frequency is a harmonic of the first frequency. Often several harmonics are present. The invention includes a second apparatus (30, 34) for substantially eliminating vibration at the first frequency and a third apparatus (48, 50) for substantially eliminating vibration at the second frequency. The second apparatus includes a mass (30) and a motor (34) for driving same. The mass (30) is disposed to counter the vibration created by the first apparatus when the motor (34) is driven by a first current. The third apparatus includes a sensor (48) for detecting the vibration at the second frequency and providing an output in response to a sensed force F resulting therefrom. The third apparatus further includes a feedback circuit (50) for providing a second current for driving the motor. The second current is the sum of the first current and a feedback current $I_{b2}$. The feedback current $I_{b2}$ is equal to $-G_f(s)F$, where $-G_f(s)$ is a feedback transfer function. The feedback transfer function is a product of a first transfer function $H_I(s)$ representing dynamics of the second apparatus required to cancel the vibration at the first frequency and a second transfer function $G_D(s)$ representing the dynamics of the second means required to cancel the harmonic vibration.

17 Claims, 10 Drawing Sheets

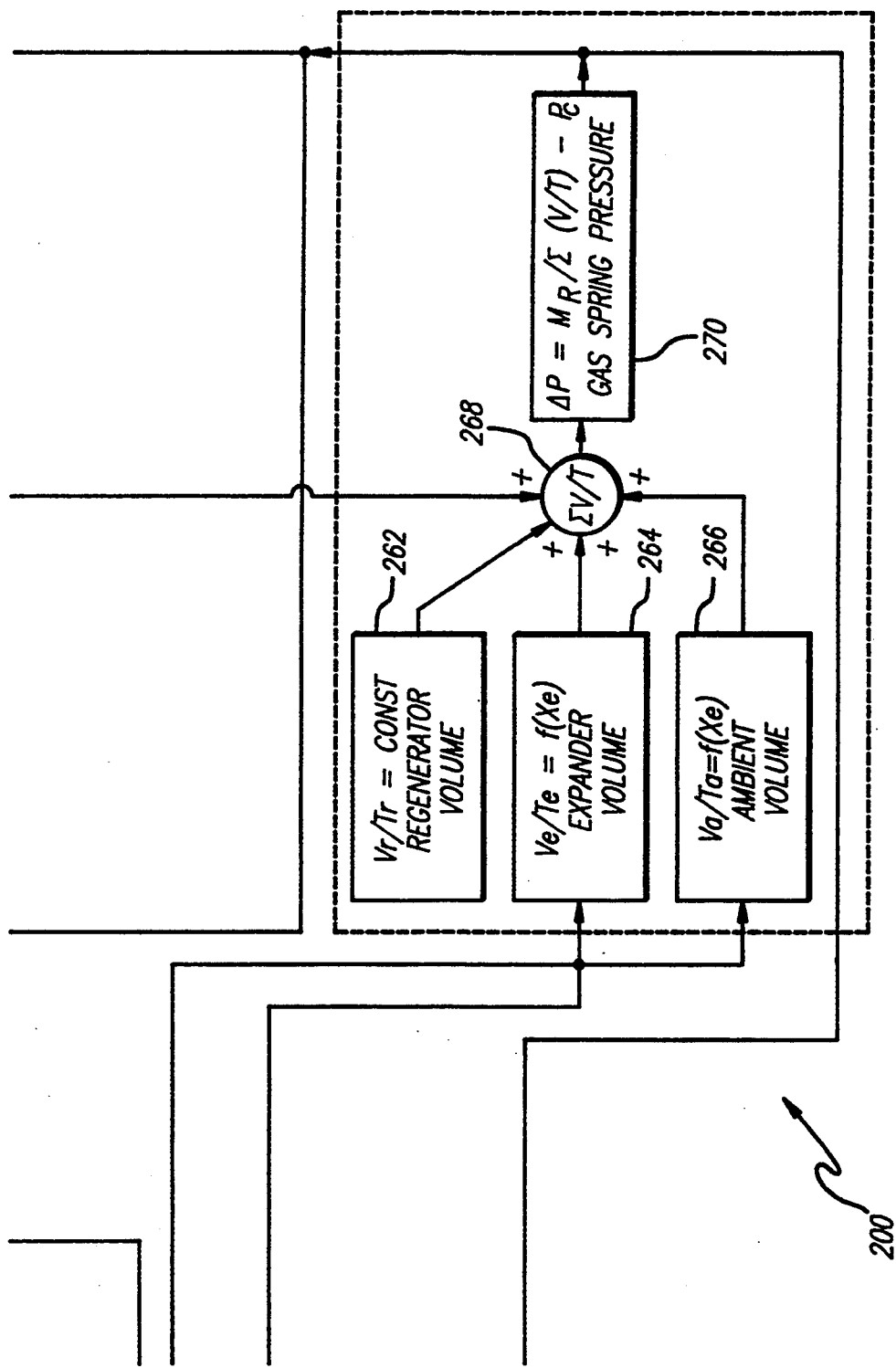
FIG. (4C) *PRIOR ART*

CYROGENIC COOLING SYSTEM WITH ACTIVE VIBRATION CONTROL

BACKGROUND OF THE INVENTION

1. Field of the Invention

The present invention relates to cryogenic cooling systems. More specifically, the present invention relates to systems and techniques for reducing vibration generated by cryogenic coolers.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Cryogenic coolers are used to cool infrared detectors to cryogenic temperatures between 40 to 80 degrees Kelvin. For this purpose, a Stirling cycle cooler is often used. A conventional Stirling cycle engine consists of a compressor piston with a cylinder, an expansion piston with a cylinder, and a drive mechanism. The drive mechanism converts rotary motion of a motor and crankshaft to a reciprocating motion of the two pistons ninety degrees out-of-phase. A regenerator and a crankcase housing are also included. Cooling is effected by the expansion cycle of a gas at the regenerator/expander assembly.

The basic Stirling cycle engine technology is employed in a Split-Stirling cooler with the exception that the reciprocating displacer piston and cylinder located within the expander are physically separated from the compressor and the regenerator is located within the displacer piston. The reciprocating displacer piston within the expander and the compressor are then interconnected with a small diameter gas transfer line which is sufficiently flexible to avoid the introduction of excessive spring torque to the system. This design permits the compressor, which is large compared to the expander, to be located remotely where available volume and heat rejection capability exists. The Split-Stirling cryogenic cooler is electrically driven so that gas pressure differentials on opposite sides of the displacer piston and cylinder provide the motive force to the cryogenic cooler.

Unfortunately, although the Stirling cycle cooler offers adequate lifetime cooling capacity in an efficient mechanical operation, the operation of the cooler often induces vibration in the detector being cooled.

Accordingly, there has been a need in the art for a system or technique for minimizing vibration from Stirling cycle coolers.

This need was addressed somewhat by a Split-Stirling cycle cooler in which both the compressor and expander modules are designed to achieve a low vibration level by incorporating an opposed reaction mass/actuator within the same housing to obtain a near perfect balance in all active forces. The imbalance forces are then controlled by a simple position matching servo-control system.

Unfortunately, because of nonlinearities in the motor drive electronics, the piston suspension flexures, and gas thermodynamics, the resulting vibrations contain high-order harmonics in addition to the fundamental drive frequency. At these high-order harmonic frequencies, the dynamic balance condition, referred to above, does not hold and the harmonic vibrations disturb the operation of the detector being cooled. Accordingly, a blur of the image output by the cooled detector results.

A position loop servo is a servo-control system that controls the position (or amplitude) of a piston motion. While position loop servos may be used to attenuate the high-order harmonic vibrations to some extent, position loop servos typically fail to provide adequate attenuation because of a limited position loop servo-bandwidth.

Another proposed solution to the problem of high-order harmonic vibration involves an increase in the position loop servo bandwidth. An increase in position loop servo-bandwidth can be achieved by increasing the gain in the forward path. While this approach offers some promise, motor drive dynamics and internal structural resonances of the suspension system prevent the implementation of higher bandwidth servos.

Electronic image motion correction for compensating these induced vibrations tends to be slow and expensive.

Thus, a need remains in the art for an effective system and/or technique for reducing vibration from a Stirling cycle cooler due to high-order harmonics of a fundamental frequency.

SUMMARY OF THE INVENTION

The need in the art is addressed by the cryogenic cooling system of the present invention. The inventive system includes a first apparatus for cooling a mass. The first apparatus creates a vibration at a first frequency and second frequency. In a typical application, the first frequency is a fundamental frequency and the second frequency is a harmonic of the first frequency. Often several harmonics are present. The invention includes a second apparatus for substantially eliminating vibration at the first frequency and a third apparatus for substantially eliminating vibration at the second frequency. The second apparatus includes a mass and a motor for driving same. The mass is disposed to counter the vibration created by the first apparatus when the motor is driven by a first current. The third apparatus includes a force sensor for measuring the vibration at the first and second frequencies and providing an output in response to a sensed force F resulting therefrom. The third apparatus further includes a feedback circuit for providing a second current for driving the motor. The second current is the sum of the first current and a feedback current $I_{b2}$. The feedback current $I_{b2}$ is equal to $-G_f(s)F$, where $-G_f(s)$ is a feedback transfer function. The feedback transfer function is a product of a first transfer function $H_f(s)$ representing dynamics of the second apparatus required to cancel the vibration at the first frequency and a second transfer function $G_D(s)$ representing the dynamics of the second means required to cancel the harmonic vibration.

This transfer function is effective to provide a feedback current which when added to the motor drive current causes the second apparatus to create a vibration which cancels the vibration at the fundamental frequency along with multiple discrete harmonics thereof.

BRIEF DESCRIPTION OF THE DRAWINGS

FIG. 4 which comprises FIGS. 4(a), 4(b) and 4(c) depicts the essential blocks of a well known single DOF dynamic model of a Stirling cycle cooler showing the compressor and expander modules with coupling thermodynamics.

DESCRIPTION OF THE INVENTION

Illustrative embodiments and exemplary applications will now be described with reference to the accompanying drawings to disclose the advantageous teachings of the present invention.

Figure 1:
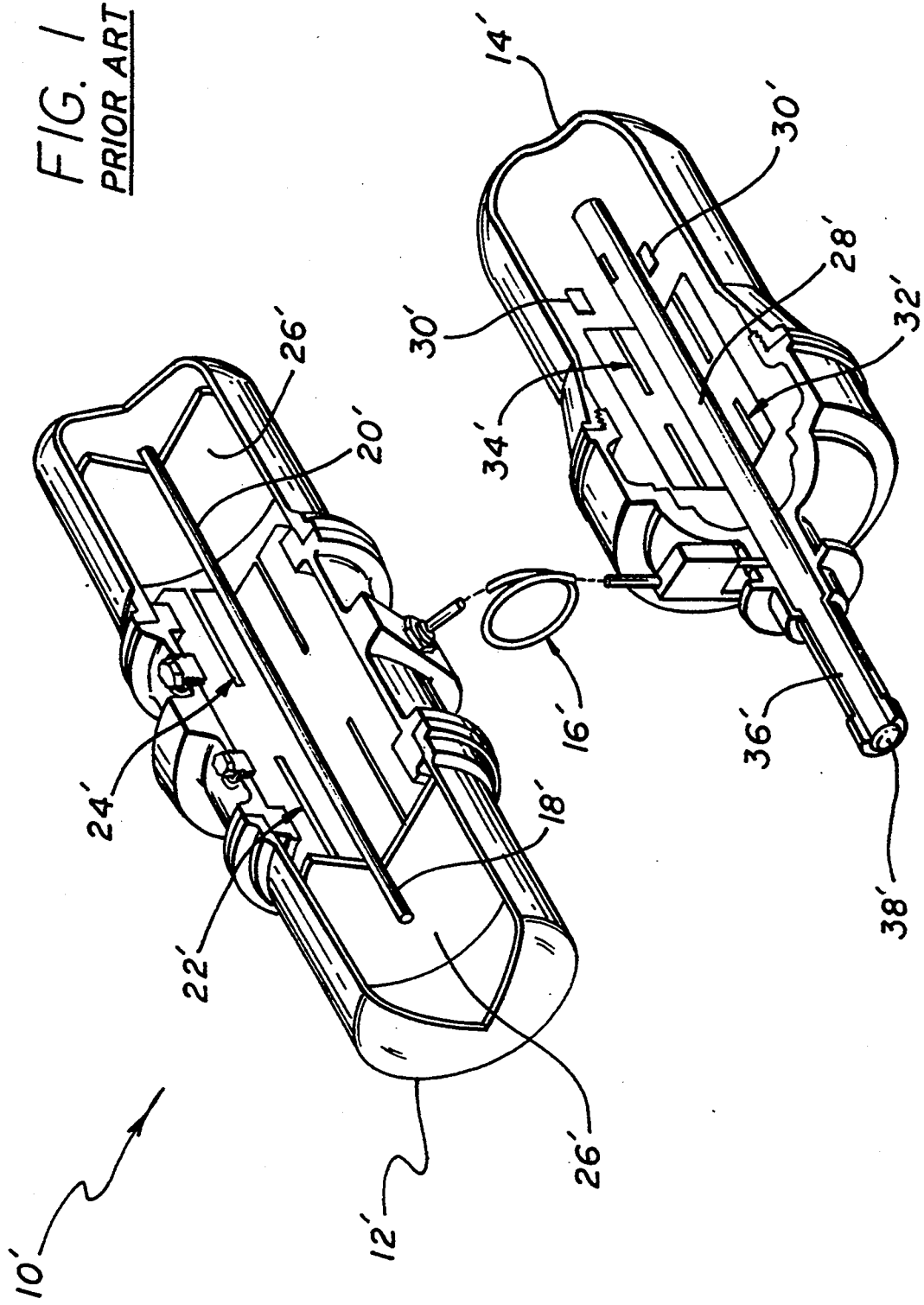
FIG. 1 depicts a conventional Stirling cycle cryogenic cooler with cutaway views of the compressor and expander modules.

FIG. 1 depicts a conventional Stirling cycle cooler with a compressor 12', an expander 14' and a transfer line 16' therebetween. The compressor 12' has dual pistons 18' and 20' driven by linear motors (solenoids) 22' and 24'. Suspension flexures 26' are disposed at the distal end of each piston to provide smooth linear motion while maintaining high radial stiffness. The expander 14' includes a displacer piston 28' and a counteracting balance mass 30'. Both the compressor and the expander pistons are driven by electromagnetic voice-coil motor drives. Hence, the displacer piston 28' is driven by a first linear motor 32' while the balance mass 30' is driven by a second linear motor 34'. A regenerator 36' is disposed at the cold end 38' of the expander cylinder.

The compressor pistons 18', 20' cyclically vary the helium pressure within the cryogenic cooler 10' while the expander piston 28' cyclically compresses and expands the small volume of gas at the cold end 38' of the expander cylinder. By operating in quadrature with the compressor, the expander piston compresses the gas at the cold end when the system pressure is at a minimum and expands it when the system pressure is at a maximum. Thus, the gas does more work on the expander piston than the expander piston does on the gas, providing net refrigeration. The gas shuttles back and forth between the compressor space (e.g., ambient temperature) and the expander cold end (e.g., 65° K) through a regenerator, which is an integral part of the expander piston. The regenerator greatly increases the cooling capacity by storing the thermal energy changes over many cycles.

The compressor, with its dual-opposed piston design, is inherently well balanced. Equal drives are applied to balanced piston assemblies that act on a common gas volume, ensuring low residual vibration. At the expander end, however, a dual opposed design has packaging and thermodynamic (heat leak) disadvantages. The balance mass does not see the same fluctuating pressure forces and dissipative regenerator pressure forces as the expander piston. Although the balance mass substantially cancels the reaction forces at the fundamental stroke frequency, the residual vibrations contain many higher order harmonics that are much more difficult to suppress. The suppression of these harmonics is therefore an object of the present invention.

Figure 2:
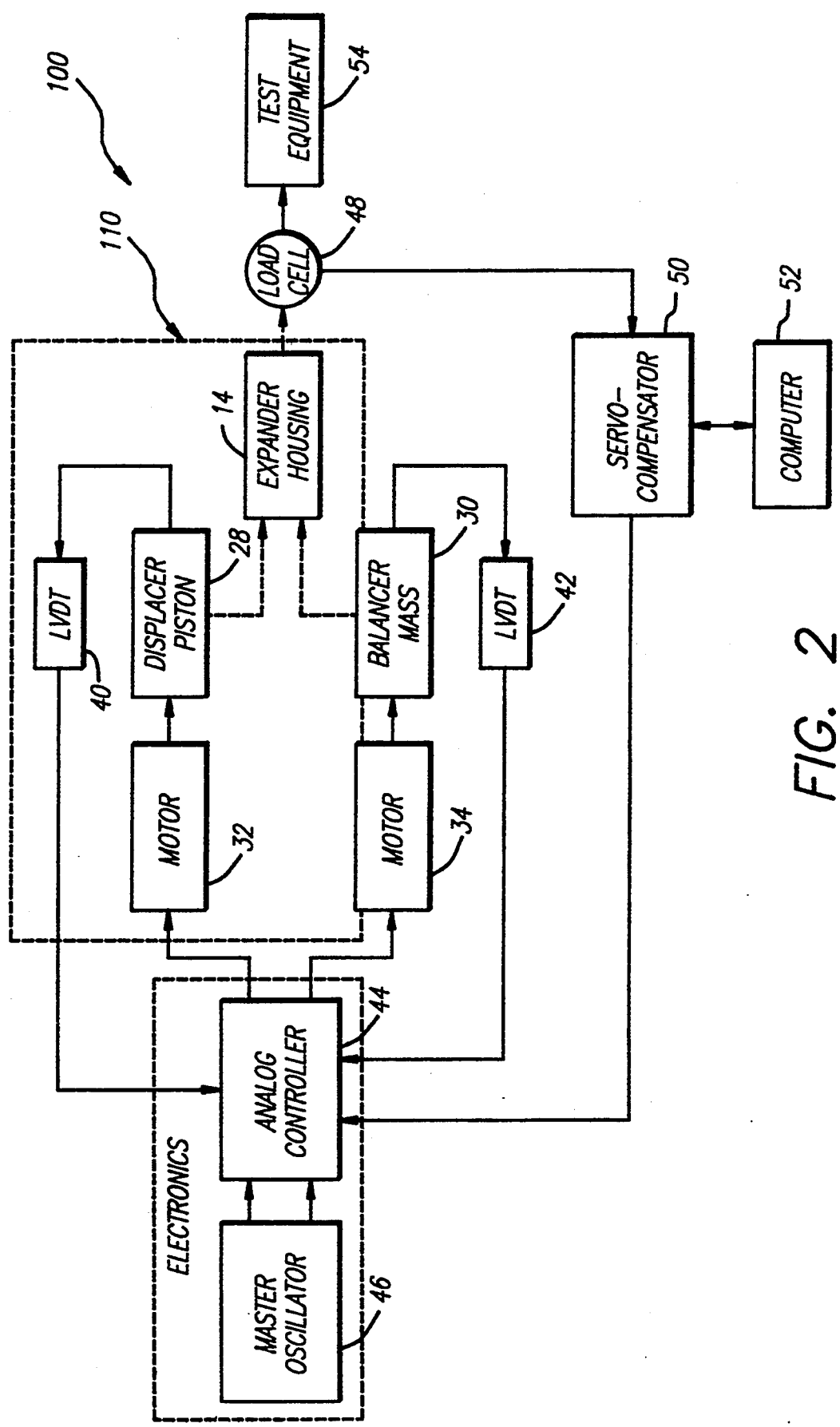
FIG. 2 is a simplified block diagram of a cryogenic cooler incorporating the teachings of the present invention.

FIG. 2 is a simplified block diagram of a cryogenic cooler constructed in accordance with the teachings of the present invention to suppress vibration at the fundamental frequency along with discrete higher order harmonics thereof. The system 100 is shown with a simplified cryogenic cooler 10 in which only the expander is shown with a displacer piston 28 and balance mass 30. The displacer piston 28 is shown with its drive motor 32. A second drive motor 34 is adapted to drive the balance mass 30. The displacer piston 28 and the balance mass 30 induce counteracting vibrations into the expander housing 14. The position of the displacer piston 28 is detected by a first linear variable differential transformer (LVDT) 40 and the position of the balance mass 30 is detected by a second LVDT 42. The outputs of the first and second LVDTs are supplied to an analog controller 44.

In accordance with conventional teachings, the analog controller 44, when driven by a master oscillator 46, supplies a drive current to the displacer and balance mass motors 32 and 34, respectively, which insures that the vibrations at a fundamental frequency, induced by the displacer piston 28, will be offset by vibrations induced by the balance mass 30. That is, during cryogenic operation, both the displacer piston and the balancer mass are driven at a single frequency (e.g. 35 Hz) with an adjustable amplitude and phase. The positions of the pistons are detected by the position sensing devices (LVDTs) and fed back to a command summing junction in the analog controller 44, where they are compared with reference signals provided by the master oscillator 46.

In accordance with the present teachings, however, a transducer, load cell or force sensing device 48 is mechanically coupled to the expander housing to detect vibrations at the higher order harmonic frequencies. The transducer 48 supplies a sensed force signal to a servo-compensator 50 which is implemented with digital signal processor (DSP). The DSP 50 generates a feedback current for the analog controller. The DSP has a unique transfer function as discussed more fully below. The transfer function of the DSP allows the DSP 50 to generate a signal which, when fed back to the drive motor 34 of the balance mass, is effective to cause the balance mass to generate vibrations which counteract the higher order harmonics of the vibrations created by the displacer piston 28. A personal computer 52 is linked to the DSP to allow the designer to dynamically modify system parameters in real time. The performance of the system may be observed by test equipment 54 connected to the load cell 48.

Figure 3:
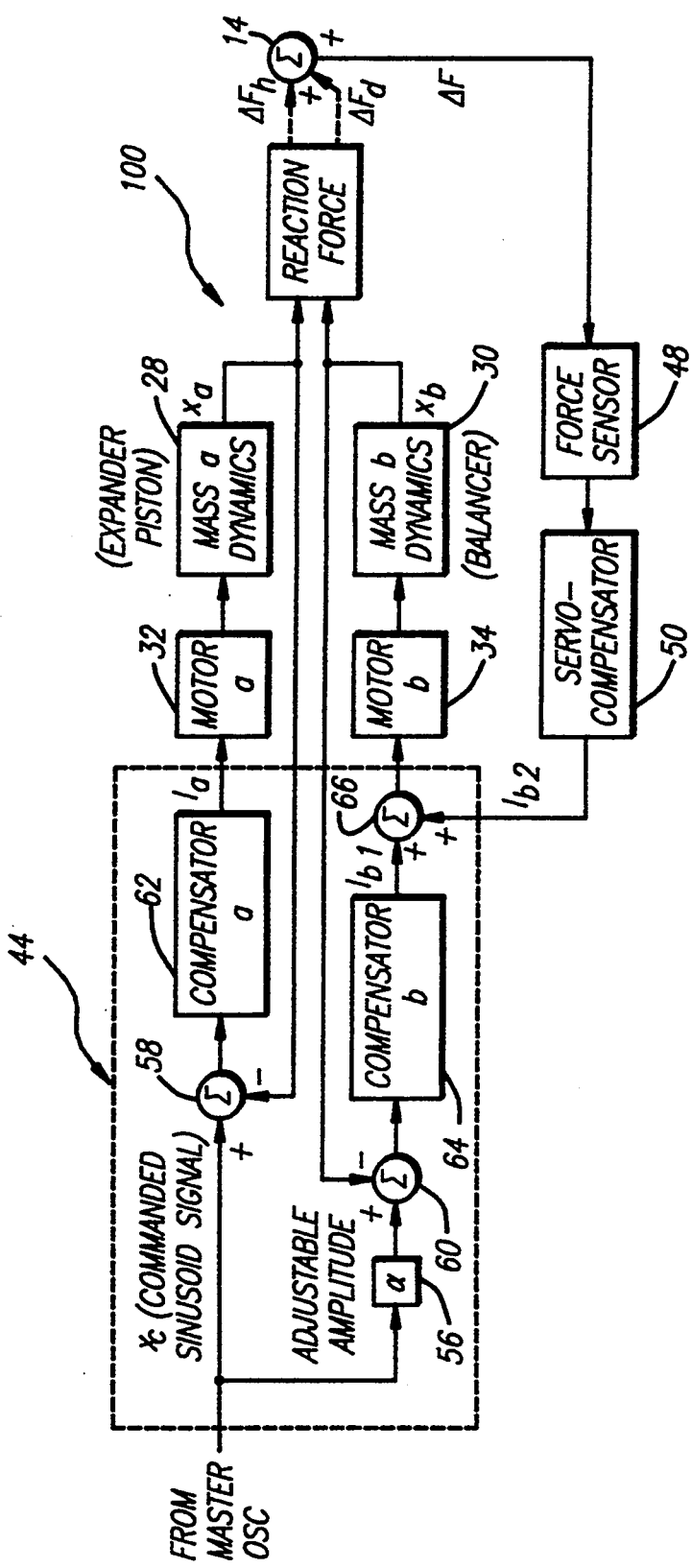
FIG. 3 is a functional block diagram of the system of FIG. 2.

FIG. 3 is a functional block diagram of the system 100 of FIG. 2 showing the analog controller in greater detail. In FIG. 3 the master oscillator 46 is omitted. However signals from the master oscillator are supplied to an adjustable amplifier 56 with a gain of α and to a first summing junction 58. The output of the adjustable amplifier 56 is fed to a second summing junction 60. The first summing junction 58 combines the output of the master oscillator with the output of the first LVDT 40 and feeds the sum to a first compensator 62. The second summing junction 60 combines the amplified output of the master oscillator with the output of the second LVDT 42 and feeds the sum to the second compensator 64. The first and second compensators serve to stabilize the position loop servos. The amplifier 56, first and second summing junctions 58 and 60 and the first and second compensators 62 and 64 comprise the analog controller 44.

During cryogenic operation, both the displacer and the balancer are driven at a single frequency with adjustable phase and amplitude. The outputs of the LVDTs are fed back to the command summing junctions 58 and 60 for comparison with the reference signals. The position errors are compensated by the compensators. The compensated outputs are then used to command the current loops for driving the linear motors. The amplitude and phase corrections are applied to the balancer position command so that the residual vibration forces acting on the expander housing structure are minimized. However, as discussed above, because of the nonlinearities in the motor drive electronics, the piston suspension flexures, and the gas thermodynamics, the resulting vibration forces contain higher-order harmonics in addition to the fundamental drive frequency. When driven by a single frequency sinusoid, the net motion of either the displacer or the balancer is produced only at the fundamental drive frequency and its harmonics. Because of the essentially time-invariant nature of the cryogenic cooler, the amplitude of these harmonics remain nearly stationary. Therefore, the net position can be accurately modeled as a summation of the fundamental drive frequency and its harmonics. This model, discussed below, facilitates the design of the transfer function for the servo-compensator 50 which allows the servo-compensator to generate feedback drive signals effective to eliminate the higher order harmonic vibration. Thus, the combined reaction force from the displacer piston and the balance mass and summed on the expander housing 14. The force sensor (transducer) 48 senses the higher order harmonics and provides a corresponding sensed signal to the servo-compensator 50. The output of the servo-compensator is fed back to the balance mass drive motor 34 via the summing junction 66 of the analog controller 44.

The model and transfer function for the servo-compensator 50 are derived as follows. The complicated dynamics of a cryogenic cooler system requires multiple degrees of freedom (DOF) to completely describe vibrations in all axes. However, inasmuch as vibrational energy along the axial axis is of interest, only a single degree of freedom motion will be considered in the following analysis. The axial axis is the axis along the line of horizontal piston motion.

Figure 4A:
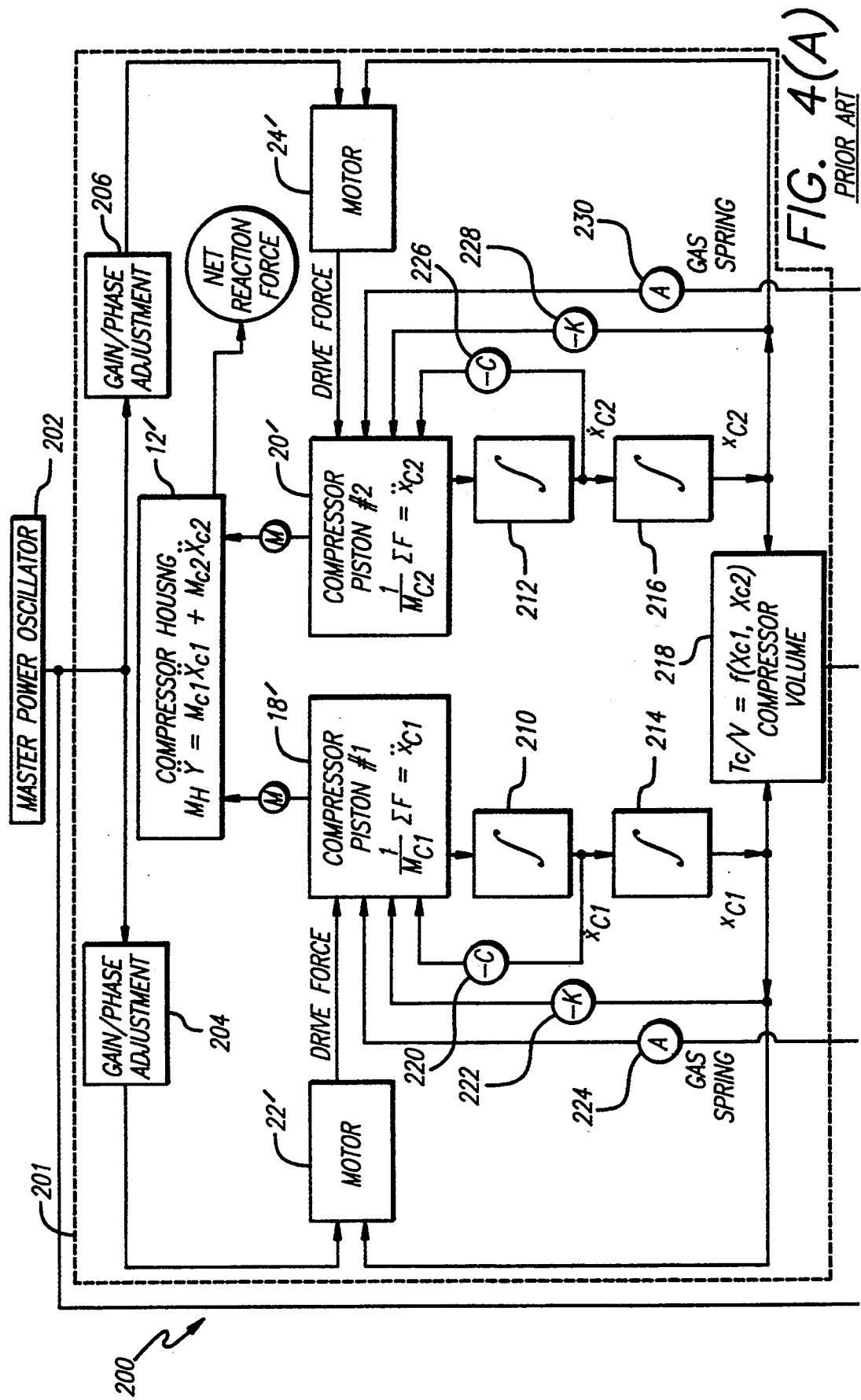
Figure 4B:
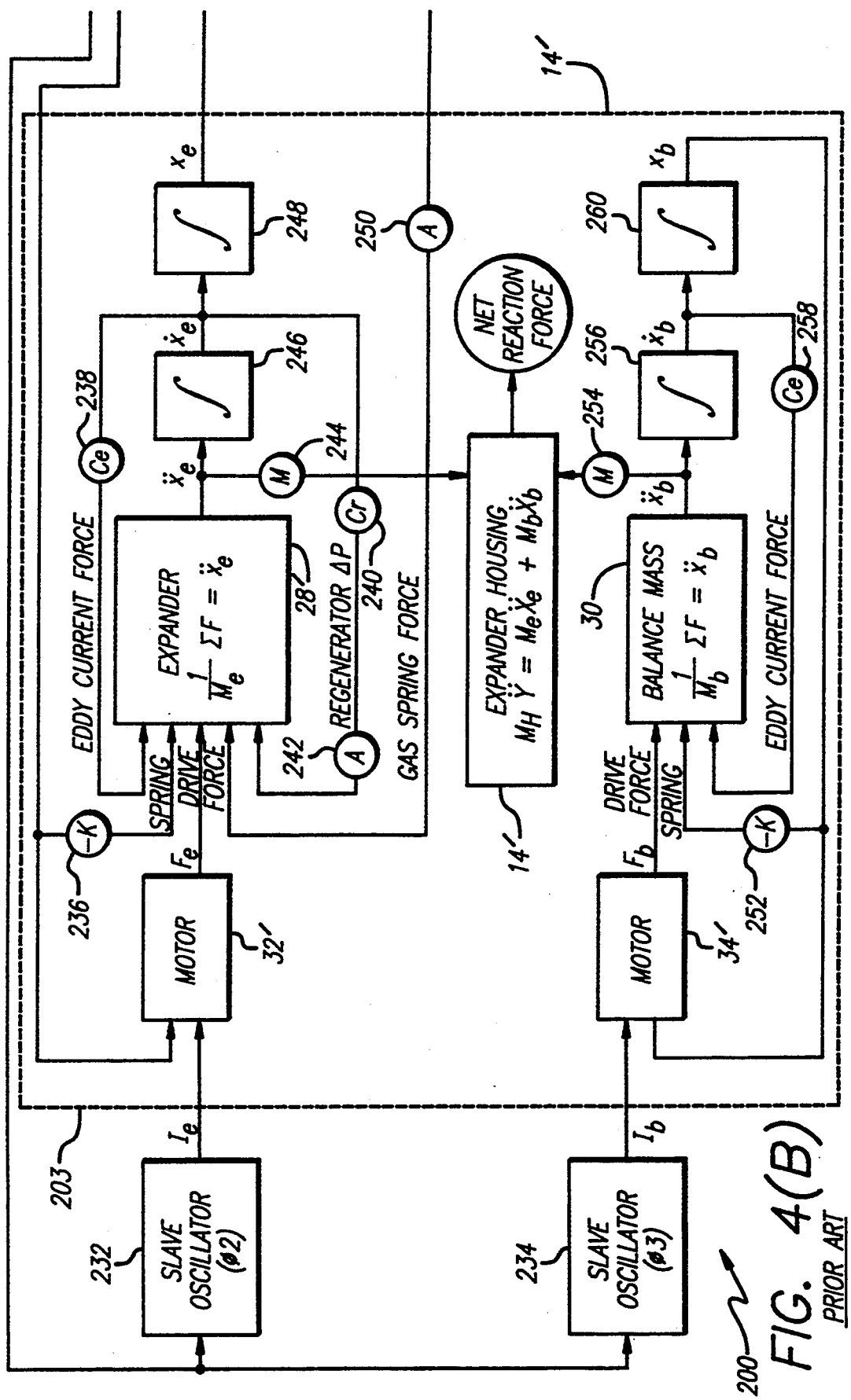

FIG. 4 depicts the essential blocks of a single DOF dynamic model of a Stirling cycle cooler showing the compressor and expander modules with coupling thermodynamics. The model shows the connections between the compressor module 201 (with two pistons), the expander module 203 (with a displacer and a balancer), and thermodynamic coupling therebetween. As shown in FIG. 4, each moving mass is subject to a set of forces as defined by Newton's law. The pressure forces produced by the thermodynamic effect are applied to all the moving mass except the balancer. As a result, there is an intrinsic force imbalance in the expander module. The following focuses on the fundamental drive frequency and its harmonics with respect to the expander module:

$$x(t) = \sum_{i=1}^{n} a_i \sin(2\pi i f_D t) = x_f(t) + \tilde{x}_D(t) \quad [1a]$$

with $$a_1 = 1; \; x_f(t) = \sin(2\pi f_D t); \; \tilde{x}_D(t) = \sum_{i=2}^{n} a_i \sin(2\pi i f_D t)$$

where x(t) represents the net position of either the displacer or the balancer, n is the number of harmonics present, $a_i$ are the amplitudes of the ith harmonic signal, $f_D$ is the fundamental drive frequency, $x_f(t)$ is the position due to vibration at the fundamental frequency and $\tilde{x}_D(t)$ is the position due to the harmonic vibration.

In order to simplify the mathematical expression, the following analysis assumes that there is only one harmonic frequency. Nonetheless, the analysis set forth below may readily be extended to the general case.

Figure 5:
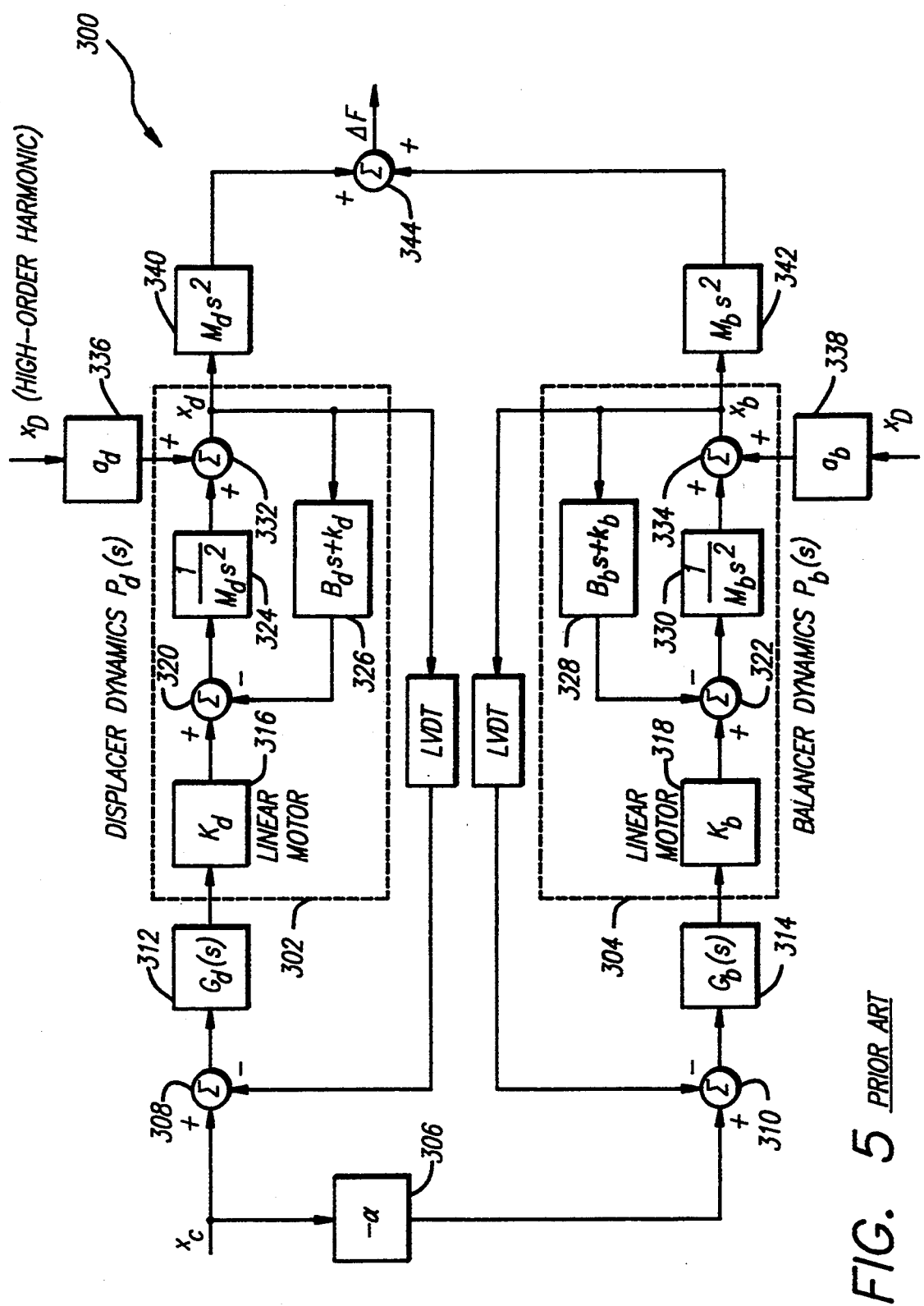
FIG. 5 shows a simplified servo block diagram that illustrates the dynamic responses of the displacer and balancer motions of a conventional Stirling cycle cryogenic cooler subject to a commanded reference signal.

FIG. 5 shows a simplified servo block diagram that illustrates the dynamic responses of the displacer and balancer motions of a conventional Stirling cycle cryogenic-cooler subject to a commanded reference signal. The motor current drive dynamics is neglected here since its frequency response is far beyond our interest. As shown in FIG. 5, the net force acting on the expander module housing is given by:

$$F = M_d \ddot{x}_d + M_b \ddot{x}_b \quad [1b]$$

or in the frequency domain:

$$F(s) = M_d s^2 x_d(s) + M_b s^2 x_b(s) \quad [2]$$

where $M_d$ and $M_b$ are the displacer piston mass and the balancer mass respectively, and $x_d(s)$, $x_b(s)$ describing the linear motions of the displacer piston and the balancer mass, can be obtained as follows:

$$x_d = \frac{G_d P_d}{1 + G_d P_d} x_c + \frac{a_d}{1 + G_d P_d} x_D \quad [3]$$

$$x_b = \frac{-\alpha G_b P_b}{1 + G_b P_b} x_c + \frac{a_b}{1 + G_b P_b} x_D \quad [4]$$

where $G_d$, is the displacer position loop servo-compensator transfer function, $G_b$ is the balancer position loop servo-compensator transfer function; $P_d$ is a transfer function which represents the displacer dynamics, $P_b$ is a transfer function which represents the balancer dynamics, $a_d$ and $a_b$ are amplitudes representing the harmonic signal coupling coefficients, $x_c$ is the commanded fundamental drive signal; α is the adjustable amplitude and $x_D$ is the harmonic signal.

It is noted that the dependent variable "s" is omitted in the above equations. If it is assumed that both the displacer and the balancer have an identical closed loop response, then by substituting equations (3) and (4) into equation (2), one obtains:

$$F = (M_d - \alpha M_b)s^2 H_c x_c + (a_d M_d + a_b M_b)\frac{s^2 x_D}{1 + GP} \quad [5]$$

where $$H_c = \frac{G_d P_d}{1 + G_d P_d} = \frac{G_b P_b}{1 + G_b P_b} = \frac{GP}{1 + GP} \quad [6]$$

From equation (5), it is clear that if the parameter $\alpha$ is set to be equal to $M_d/M_b$, then the net force, F, will only be generated by the disturbance for $F_D$, or $(a_d M_d + a_b M_b)s^2 x_D$. In the compressor module, $M_d = M_b$ and $a_d = -a_b$ due to virtually identical (opposed) pressure forces and identical moving masses, hence the compressor module has a well balanced condition even at harmonic frequencies. On the other hand, since the balancer is not exposed to the pressure force, the absolute value of $a_d$ is not equal to the absolute value of $a_b$. As a result, the only vibration force suppression is this case comes from the wide-band error rejection characteristics of a closed position loop servo:

$$F = \frac{F_D}{1 + GP} \quad [7]$$

In order to provide an adequate vibration force attenuation, the position loop servo needs to have a higher control bandwidth, which may not be realizable since the control bandwidth is limited by the motor drive dynamics and the structural stiffness of the suspension system.

Figure 6:
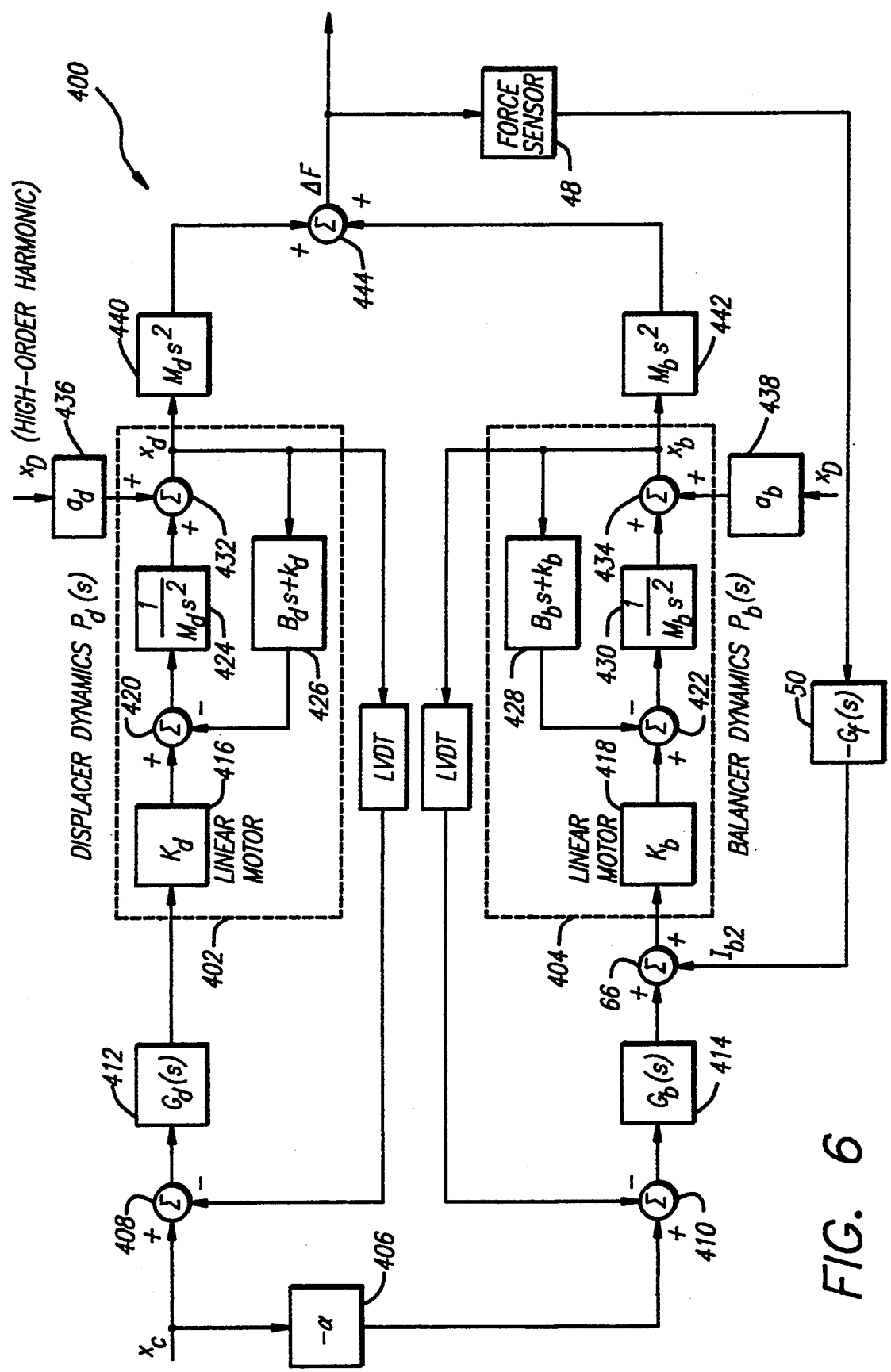
FIG. 6 is a simplified servo block diagram that illustrates the dynamic responses of the displacer and balancer motions subject to a commanded reference and a feedback signal in accordance with the present teachings.

If one more current command, $I_{b2}$, is added to the balancer motor drive in accordance with the teachings of the present invention, as indicated in FIG. 6, then the net force acting on the expander module housing becomes:

$$F = \frac{F_D}{1 + GP} + \frac{M_b s^2 P}{1 + GP} I_{b2} \quad [8]$$

After introducing this additional current command, the control objective is then to find a feedback control relationship as a function of load cell output, of $I_{b2} = -G_f(s)F$ such that the net force is driven to zero at all the harmonic frequencies. In order to accomplish this objective, the vibration force should be chosen such that the resultant open loop transfer function (from the disturbance force input $F_D$ to the measured force output F) produces an infinite gain at the harmonic frequencies. Accordingly, letting $G_f(s)$ be expressed as:

$$G_f(s) = H_f(s) G_D(s) \quad [9]$$

with $$H_f(s) = \frac{1 + G_b P_b}{M_b s^2 P_b} \quad [10]$$

where $G_b$ is the balancer servo-compensator transfer function, $P_b$ is a transfer function representing the balancer dynamics, and $M_b$ is the balancer mass; then equation (8) becomes:

$$(1 + G_D(s))F = \frac{F_D}{1 + GP} \quad [11]$$

or $$F = \left(\frac{1}{1 + G_D(s)}\right)\left(\frac{F_D}{1 + GP}\right)$$

It can be shown that if $$G_D(s) = \frac{K_D s}{s^2 + \omega_D^2} \quad [12]$$

then $$F = \left(\frac{s^2 + \omega_D^2}{s^2 + K_D s + \omega_D^2}\right)\left(\frac{F_D}{1 + GP}\right) \quad [13]$$

and thus, the net force will be driven to zero at the frequency $f_D$ for any positive constant $K_D$. Equations (9), (10), and (12) constitute the basic vibration control relationship that produces a zero net force at a single discrete frequency. For a general system with multiple discrete frequencies, the transfer function for the servo-compensator 50 becomes:

$$G_D(s) = \sum_{i=1}^{n} \frac{K_{Di} s}{s^2 + \omega_{Di}^2} \quad [14]$$

where $K_{Di}$ is the ith undamped filter coefficient; $\omega_{Di}$ is the ith undamped filter frequency (in radians), "s" is the Laplace operator, and "n" is the number of harmonics present.

As long as there exists a set of constant parameters $K_{Di}$ so that the closed loop system, equation (13), is stable, then the net force will be substantially zero at all discrete frequencies.

Figure 9:
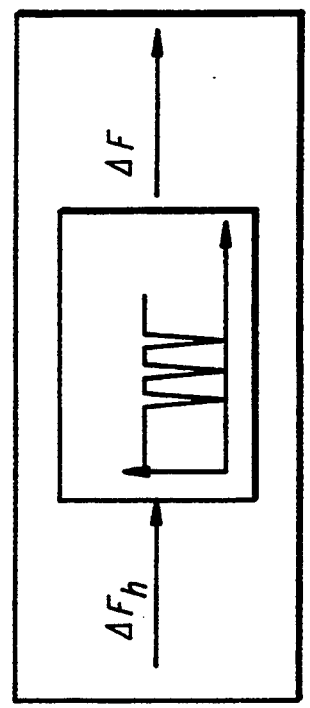
FIG. 9 illustrates the narrowband notch filtering effect is produced at each of the harmonic frequencies by the feedback transfer function.
Figure 7:
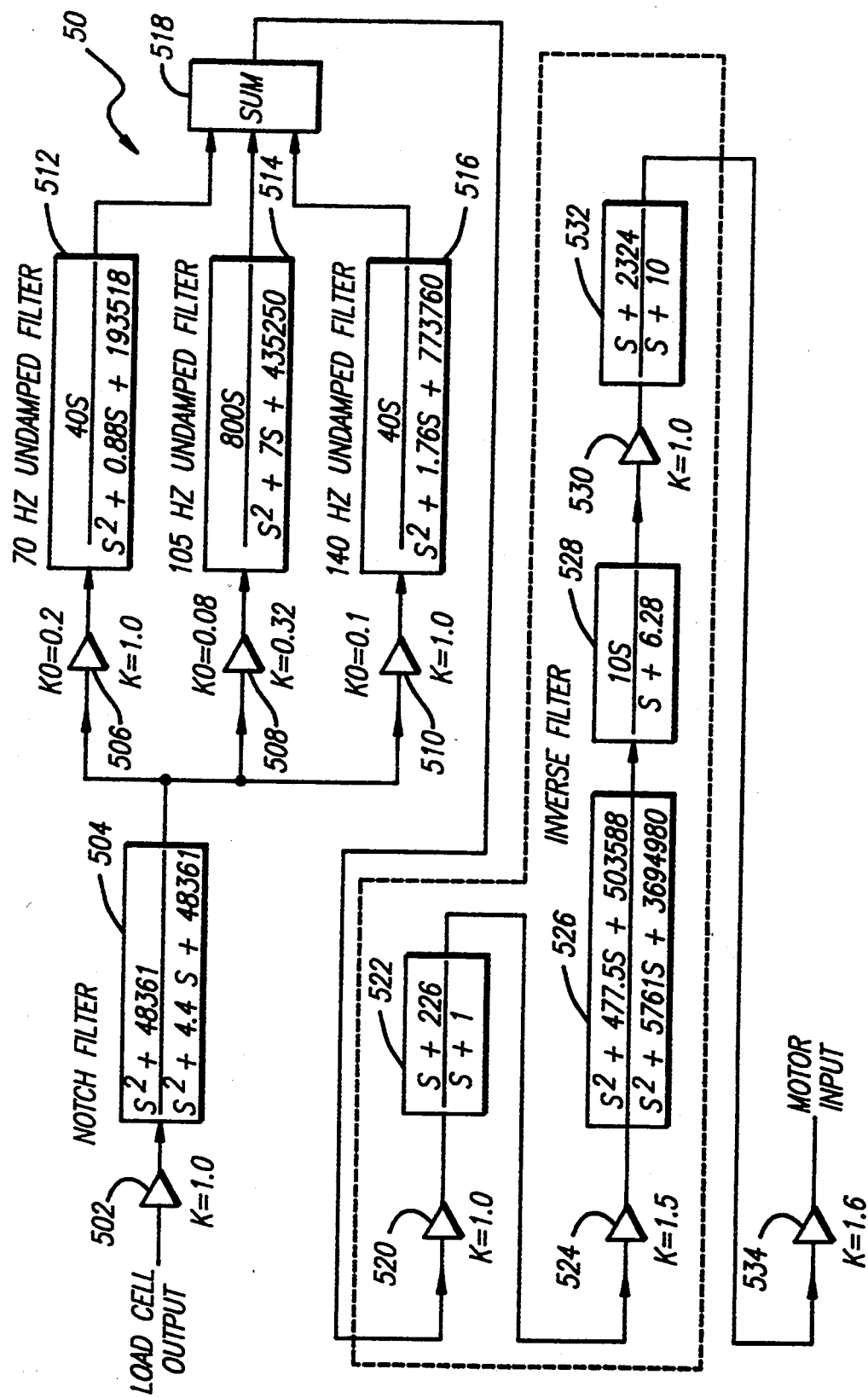
FIG. 7 is a block diagram of the transfer function of the servo-compensator of the present invention.
Figure 8:
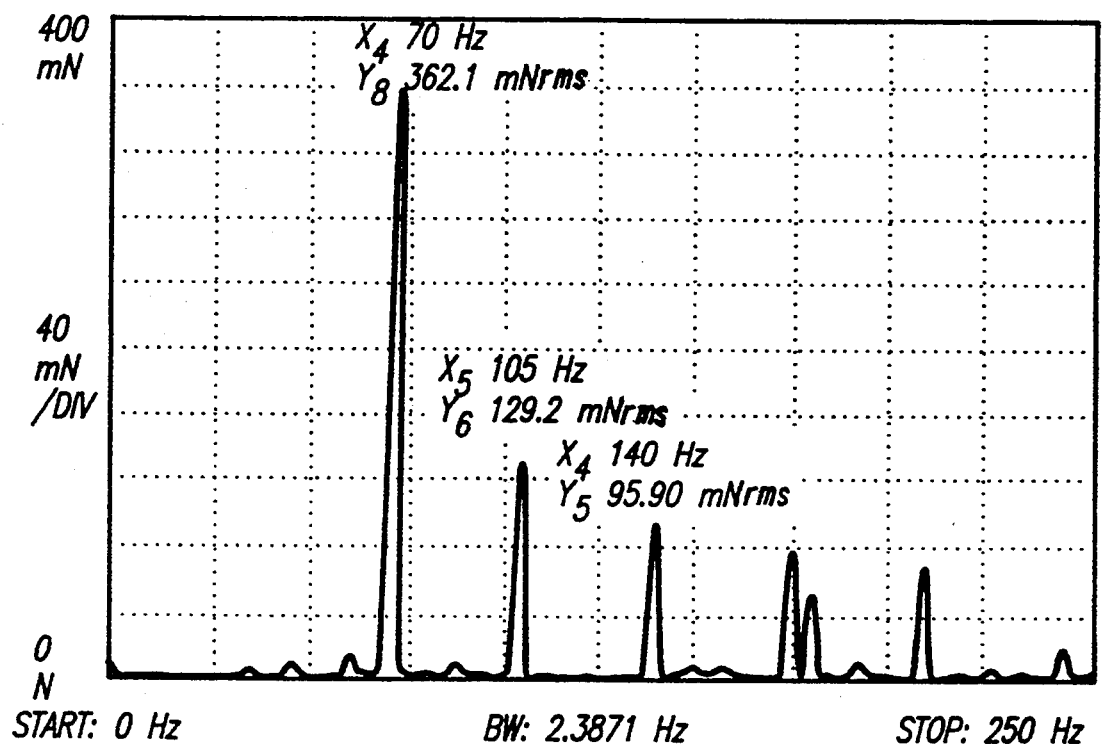
FIG. 8 illustrates vibration force spectra of a cryogenic cooler expander without the vibration control loop of the present invention.
Figure 10:
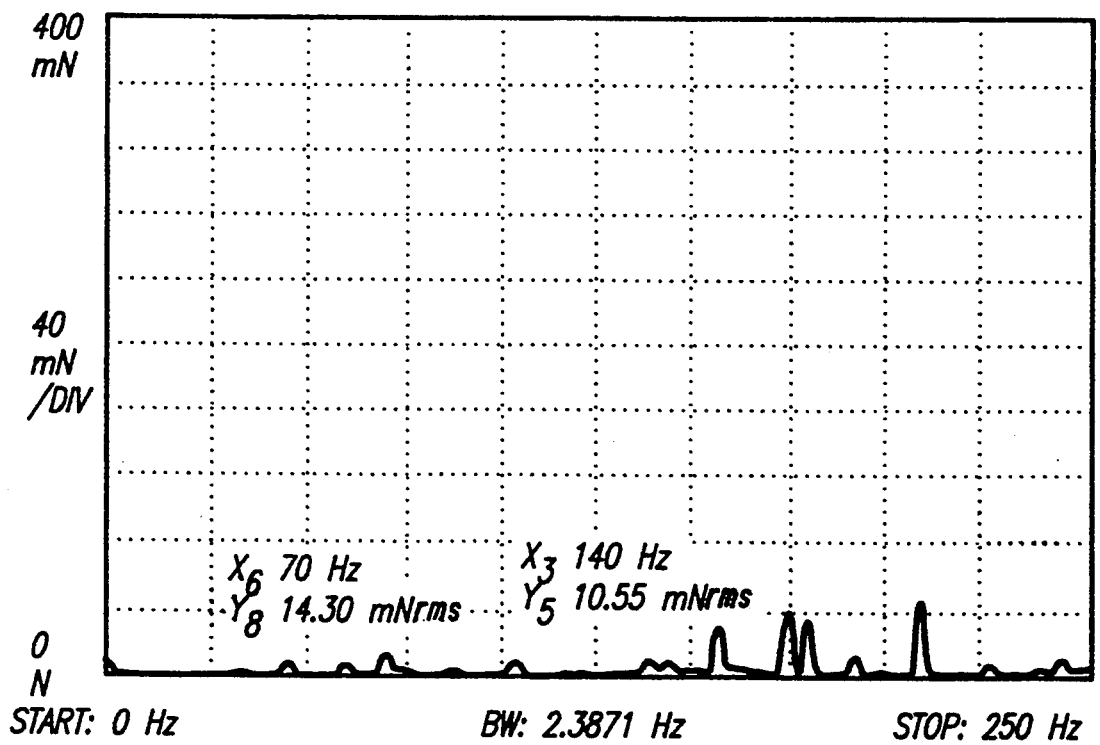
FIG. 10 illustrates the vibration force spectra of the cryogenic cooler expander of FIG. 8 with the vibration control loop of the present invention.

FIG. 7 is a block diagram of the transfer function of the servo-compensator 50 of the present invention. FIG. 8 illustrates vibration force spectra of a cryogenic cooler expander without the vibration control loop of the present invention. FIG. 9 illustrates the narrowband notch filtering effect is produced at each of the harmonic frequencies by the servo-compensator 50. FIG. 10 illustrates the vibration force spectra of the cryogenic cooler expander of FIG. 8 with the vibration control loop of the present invention.

Returning to FIG. 7, the transfer functions of equations (9), (10) and (14) are implemented in the servo-compensator 50 with a unity gain amplifier 502 with provides the sensed signal from the transducer 48 to a first notch filter 504. The transfer function of each filter is shown in the diagram of FIG. 7. The output of the first notch filter 504 is input to each of three undamped filters 512, 514 and 516 through second, third, and fourth amplifiers 506, 508 and 510, respectively. The outputs of the undamped filters are combined by a summer 518 and input to a first low pass filter 522 via a fifth amplifier 520. The output of the first low pass filter 522 is input to a second order filter 526 via a sixth amplifier 524. The output of the second order filter 526 is input to a high pass filter 528. The output of the high pass filter 528 is provided to a second low pass filter 532 via a seventh amplifier 530. The output of the second low pass 532 is amplified by an eighth amplifier 534 as the output of the servo-compensator 50.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A cryogenic cooling system with active vibration control comprising:
   first means for cooling a mass, said first means creating a first vibration at a first frequency and a second frequency;
   second means for substantially eliminating said vibration at said first frequency, said second means including a mass and motor means for driving same, said mass being disposed to counter said first vibration, and said motor means being driven by a first current; and
   third means for substantially eliminating said vibration at said second frequency, said third means including:
   means for sensing said vibration at said second frequency and providing an output in response to a sensed force F resulting therefrom and
   feedback means for providing a second current for driving said motor means, said second current being the sum of said first current and a feedback current $I_{b2}$, said feedback current $I_{b2}$ being equal to $-G_f(s)F$ where $-G_f(s)$ is a feedback transfer function which is a product of a first transfer function $H_f(s)$ representing dynamics of said second means required to cancel said vibration at said first frequency and a second transfer function $G_D(s)$ representing the dynamics of said second means required to cancel said harmonic vibration.

2. The invention of claim 1 wherein said first transfer function $H_f(s)$ is equal to $(1+G_b(s)P_b(s))M_bs^2P_b(s)$.

3. The invention of claim 2 wherein said second transfer function $G_D(s)$ is equal to the summation over the index "i" as "i" goes from 1 to a number "n" representing a number of harmonics of a plurality of terms given by the expression $K_{Di}s/(s^2+\omega_{Di}^2)$.

4. The invention of claim 1 wherein said first means includes a first piston.

5. The invention of claim 4 wherein said first means includes means for activating said first piston.

6. The invention of claim 5 wherein said first piston is activated at said first frequency.

7. The invention of claim 6 wherein said second means includes a second piston.

8. The invention of claim 7 wherein said second means includes means for activating said second piston.

9. The invention of claim 8 wherein said means for sensing said vibration at said second frequency and providing a sensed current in response thereto includes a transducer for sensing vibration at said first and said second frequencies.

10. The invention of claim 9 wherein said first transfer function $H_f(s)$ is equal to $(1+G_b(s)P_b(s))/M_bs^2P_b(s)$.

11. The invention of claim 10 wherein said second transfer function $G_D(s)$ is equal to the summation over the index "i" as "i" goes from 1 to a number "n" representing a number of harmonics of a plurality of terms given by the expression $K_{Di}s/(s^2+\omega_{Di}^2)$.

12. The invention of claim 11 wherein said motor means includes a linear motor.

13. The invention of claim 12 wherein said linear motor is a solenoid coil.

14. The invention of claim 1 wherein said first frequency is said fundamental frequency and said second frequency is a harmonic of said first frequency.

15. The invention of claim 1 wherein said cooling system is a Sterling cycle cooler.

16. The invention of claim 15 wherein said cooling system is a Split-Sterling cycle cooler.

17. A method for eliminating vibration at a harmonic of a fundamental frequency of vibration of a cryogenic cooling system, said method including the steps of:
   cooling a mass and creating a vibration at a first frequency and a second frequency;
   substantially eliminating said vibration at said first frequency by driving a mass disposed to create a vibration opposing said vibration with a motor in response to a first current; and
   substantially eliminating said vibration at said second frequency, including the steps of:
   sensing said vibration at said second frequency and providing an output in response to a sensed force F resulting therefrom and
   providing a second current for driving said motor means, said second current being the sum of said first current and a feedback current $I_{b2}$, said feedback current $I_{b2}$ being equal to $-G_f(s)F$ where $-G_f(s)$ is a feedback transfer function which is a product of a first transfer function $H_f(s)$ representing dynamics of said second means required to cancel said vibration at said first frequency and a second transfer function $G_D(s)$ representing the dynamics of said second means required to cancel said harmonic vibration.

* * * * *